United States Patent

Constantinou et al.

[11] Patent Number: 5,838,637
[45] Date of Patent: Nov. 17, 1998

[54] HYDROPHONE AND PROCESS FOR MANUFACTURING IT

[75] Inventors: Georges Constantinou, La Varenne St. Hilaire; Jean Laurent, Morainvillier; Marc Bernard, Lamorlay, all of France

[73] Assignees: Institut Francaís du Petrole; Vinci Technologies, both of Rueil-Malmaison, France

[21] Appl. No.: 848,184

[22] Filed: Apr. 29, 1997

[30] Foreign Application Priority Data

Apr. 29, 1996 [FR] France .................................. 96 05485

[51] Int. Cl.⁶ .................................................. H04R 17/00
[52] U.S. Cl. ............................................................ 367/173
[58] Field of Search .................................. 367/155, 163, 367/165, 173, 188, 174; 310/337

[56] References Cited

U.S. PATENT DOCUMENTS

| | | | |
|---|---|---|---|
| 3,489,995 | 1/1970 | Laurent | 367/172 |
| 3,763,464 | 10/1973 | Laurent | 367/155 |
| 3,832,762 | 9/1974 | Johnston et al. | 29/25.35 |
| 3,970,878 | 7/1976 | Berglund | 367/160 |
| 4,184,093 | 1/1980 | Sullivan | 310/337 |
| 4,336,639 | 6/1982 | Berglund | 367/163 |
| 4,926,397 | 5/1990 | Robertson | 367/167 |
| 5,394,379 | 2/1995 | Weichart et al. | 367/163 |
| 5,675,556 | 10/1997 | Erath et al. | 367/166 |
| 5,677,894 | 10/1997 | Erath | 367/160 |

Primary Examiner—Daniel T. Pihulic
Attorney, Agent, or Firm—Antonelli, Terry, Stout & Kraus, LLP

[57] ABSTRACT

The hydrophone according to the invention comprises at least one detection unit (1) comprising a casing made up of two cups (2a, 2b) resting on each other by a peripheral rim (3), each one of them being provided with a flexible central part, and a sensitive element (4) associated with electrodes, that is fastened to the central part of the cups, on the outer face thereof, a hollowed flat centering element (6) made of a deformable material, into which at least one casing is fitted, intended to be inserted into a tube (9) along an axial plane thereof, this centering element being provided for example with an inner slot (8) for fitting in the peripheral rim of the two cups (2a, 2b) of the casing, and a sealed protective coating (11) sheathing detection unit (1), and a part of the inner face of tube (9). Once the centering element is introduced in the tube, the substance forming the coating is injected into a thin space provided around the centering element by a two-legged moulding piece (13a, 13b) that is inserted into the tube. The hydrophone can be used in geophysical prospecting or subsea listening for example.

15 Claims, 3 Drawing Sheets

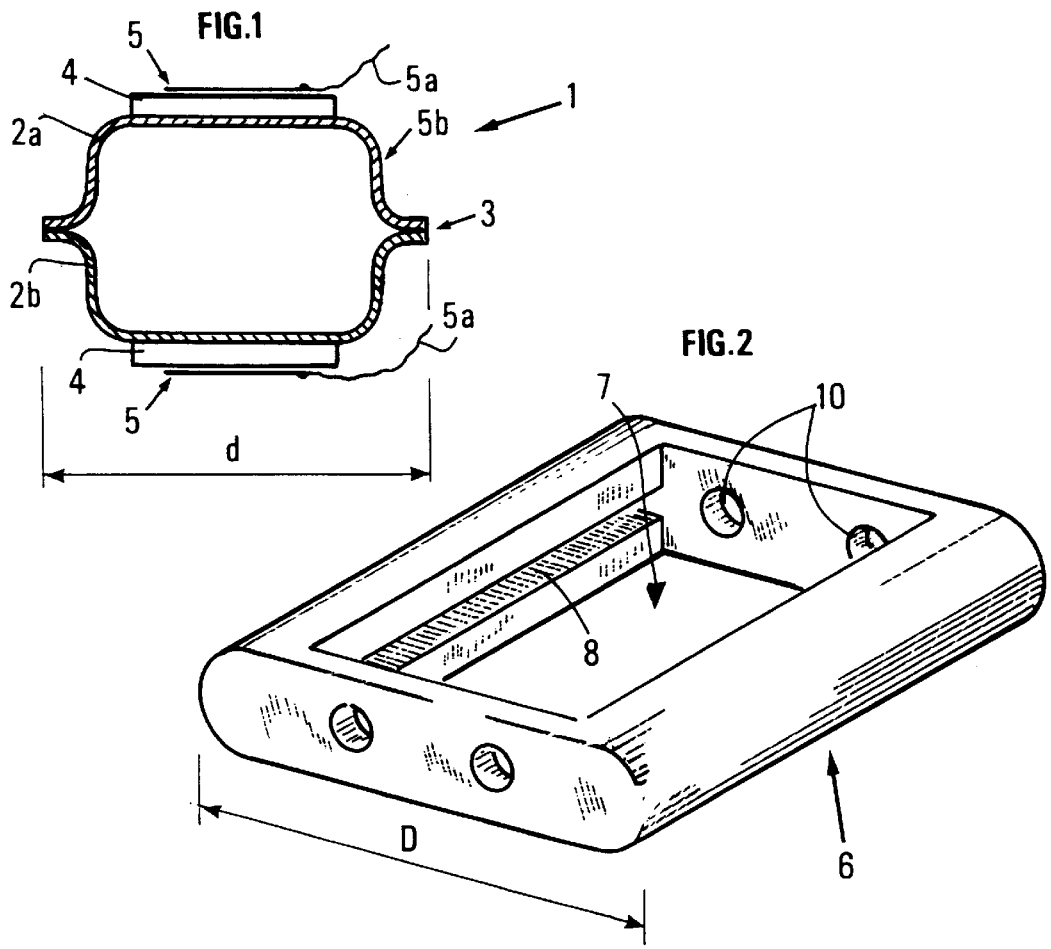
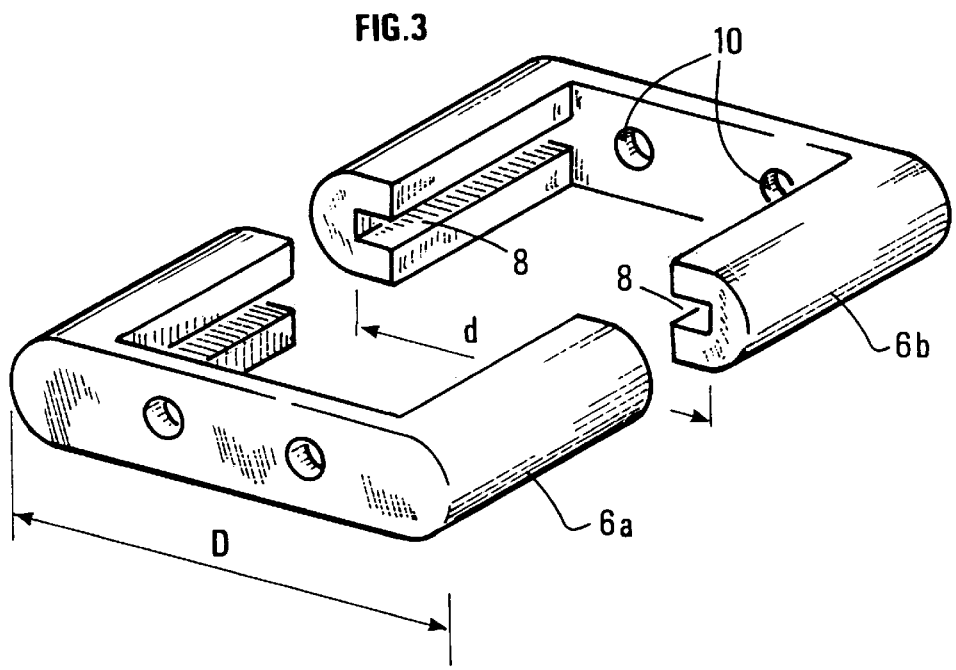

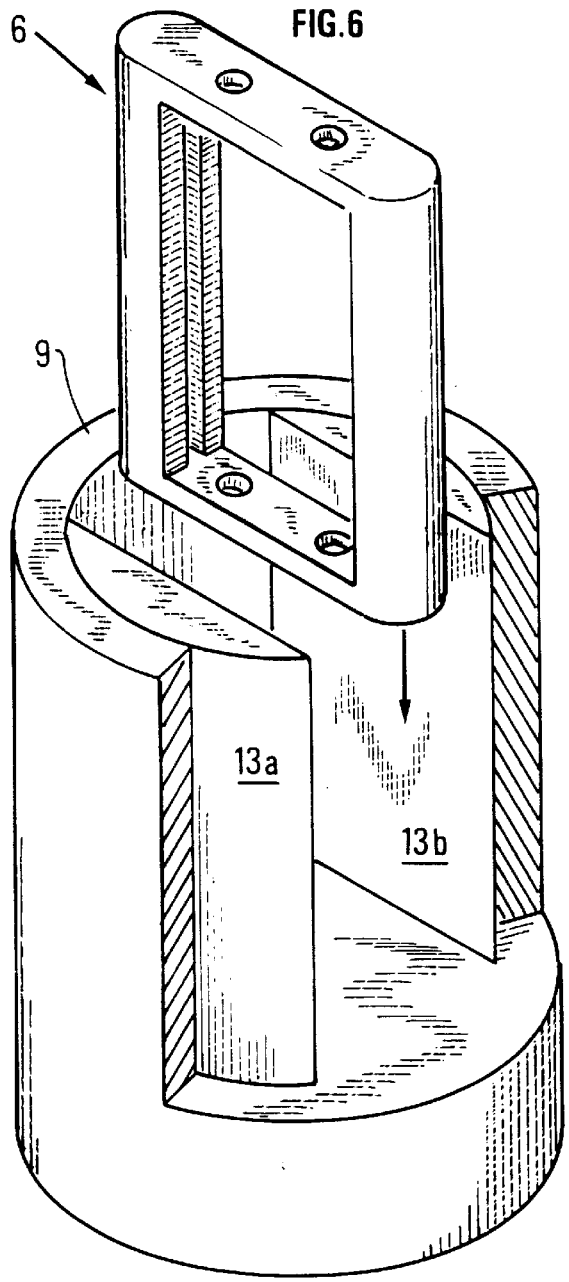
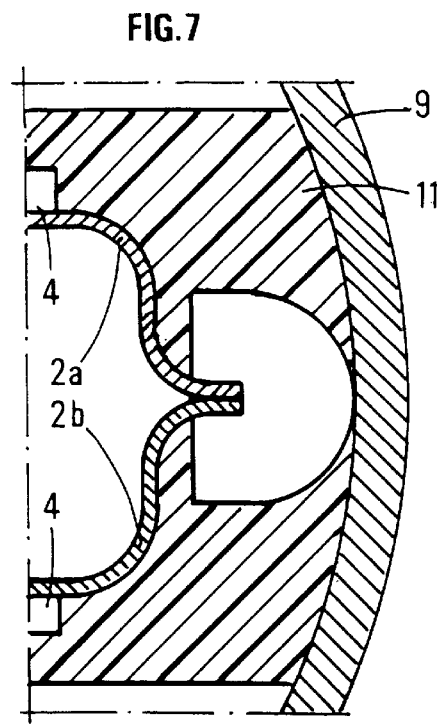
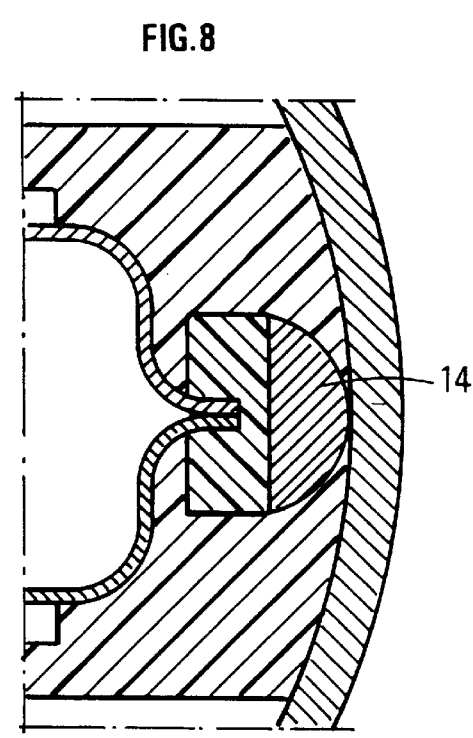

HYDROPHONE AND PROCESS FOR MANUFACTURING IT

FIELD OF THE INVENTION

The present invention relates to a hydrophone that can notably be used for the reception of acoustic or seismic waves, and to a process for manufacturing it.

BACKGROUND OF THE INVENTION

It is well-known to form a hydrophone by assembling elements sensitive to pressure variations, each one being made up of a disk made of a piezoelectric ceramic associated with a pair of electrodes placed on either side. Each disk is stuck onto a flexible support such as a diaphragm, one face of which is exposed to the pressure variations to be measured.

The flexible support exhibits for example the shape of a cup that can be supported by a rigid casing or rest on an identical cup, itself bearing one or more sensitive elements, the two cups being in contact with each other through a rim and delimiting a casing. The flexible support is for example the central part of a plate whose peripheral part is reinforced and rigid. The casing can be delimited by two analogous plates resting on each other by their thicker peripheral parts and bearing each a sensitive element. The electrodes of the two sensitive elements are interconnected electrically so as to compensate for the parasitic effects due to accelerations.

When the outside static pressure increases, the two plates bend until they rest against each other. The space between them is so selected that the maximum deformation thereof when they are pressed against each other remains within the elastic deformation limits. The detector is thereby protected from accidental overpressures. The casing thus formed can be covered with a coat of a material transparent to acoustic waves.

The sensitive elements can be fastened outside the casing, which confers a sensitivity that varies little (less than 10% for a static pressure of 10 MPa for example) with the hydrosatic pressure variations. The sensitive elements are generally covered with a protective coating (such as a coat of araldite coated with a varnish) so as to maintain a sufficient electric insulation between the electrodes. This layout allows very sensitive detectors to be obtained at a relatively low cost.

According to another well-known layout, the sensitive elements are fastened to the inner faces of the cups and therefore inside the casing, which provides a good protection from the outside environment. However, with this layout, the piezoelectric sensitive elements, which are sintered ceramic disks and thus relatively fragile, can easily suffer crush damage when the hydrostatic pressure increase causes them to be pressed against each other by bending the plates. Besides, it can be observed that their sensitivity decreases considerably with the hydrostatic pressure increase, a phenomenon that is linked with their being fastened to a face that becomes convex. Furthermore, the sensitive elements being inside, sealed ducts must be provided for the exit of the electric wires connected to the electrodes, which increases the manufacturing cost. It also appears that the sensitivity of hydrophones with sensitive elements placed inside the casing is lower. In order to overcome this drawback, manufacturers are led to increase the surface of the sensitive disks and concomitantly the diameter and the thickness of the supporting cups.

It is also well-known to position one or more of these casings containing one or more sensitive elements inside a rigid tube while interposing elastomer centering and acoustic decoupling wedges. In subsea listening applications or for seismic prospecting, these tubes are distributed in large numbers inside a supple sheath of often very great length or "seismic streamer" filled with kerosine or mineral oil that is towed while immersed by a boat. In order to protect the casings from the filling liquid, it is also well-known to cast into each tube a protective material, the casings being previously placed in protective housings.

Various piezoelectric detectors are described for example in patents FR-1,556,971 (U.S. Pat. No. 3 489 995) and 2,122,675 (U.S. Pat. No. 3 763 464) and in patent application FR-95/05,331 all in the name of one of the applicants, or in patents U.S. Pat. Nos. 3,970,878, 4,336,639 or 4,926,397.

SUMMARY OF THE INVENTION

The object of the process according to the invention is the manufacture of a hydrophone comprising at least one reception unit intended to be placed inside a rigid tube, each reception unit comprising a casing made up of two cups having each a support face resting on a corresponding support face of the other cup, each one of them being provided with a flexible central part, and at least one sensitive element associated with electrodes, that is fastened to the central part of at least one of the cups, and electric conductors connected to the electrodes of each sensitive element. It comprises successively:

fitting at least one casing into a flat rectangular centering element suited to rest by two of its opposite sides against the inner wall of the rigid tube, inserting into the rigid tube the centering element containing said casing, inserting moulding pieces into the rigid tube in order to fill a main part of the remaining inner volume of the rigid tube on either side of the centering element, except for a space of well-determined thickness on either side of the centering element, and injecting into the rigid tube, in said space around the centering element, a material forming a sealed protective sheath.

The process comprises for example withdrawal of the centering element after the protective sheath is formed so as to suppress any direct coupling of the reception unit with the rigid tube.

According to a first implementation mode, a sealing material intended to insulate each reception unit is injected into at least part of the space provided by the withdrawal of the centering element, delimited by inserting moulding pieces. A vibration damping material can be used therefore, in order to decouple acoustically each reception unit with respect to the rigid tube.

According to another implementation mode, a centering element made of a vibration damping material is used, said casing in its centering element being embedded in the injected material forming a sealed sheath.

According to the invention, the hydrophone comprises at least one detection unit comprising a casing made up of two cups having each a support face resting on a corresponding support face of the other cup, each one of them being provided with a flexible central part, and at least one sensitive element associated with electrodes, that is fastened to the central part of at least one of the cups, electric conductors connected to the electrodes of each sensitive element.

It comprises a rigid external tube, a means allowing sealed positioning of at least one casing in a diametral plane of the tube, obtained by injection of a sealing material forming a coating of controlled thickness for the detection unit and a part of the inner wall of the rigid tube.

According to an embodiment, the sealed positioning means comprises two recesses in a diametral zone of the rigid tube containing the support faces of the cups, at least part of which can be filled with a vibration damping material.

According to an embodiment, the sealed positioning means comprises a hollowed flat centering element suited to rest by two of its opposite sides on the inner wall of the rigid tube in an axial plane thereof, said element being provided with a recess for at least one casing, and a sealed protective coating of controlled thickness around this centering element.

The centering element is advantageously provided with an inner slot for fitting in a peripheral edge of the two cups of the casing. It can be made all in one piece or in two pieces between which the casing is supported, or it can be made in one U-shaped piece with two legs between which the casing is supported.

Each reception unit comprises two sensitive elements associated respectively with the two cups of each casing. The cups are obtained by means of a forming process, notably by embossing.

On account of its overall design and of its method of manufacture, the hydrophone according to the invention has at the same time small dimensions, a good sensitivity, a good resistance to the outside static pressure variations and it can be mass produced with limited manufacturing costs.

BRIEF DESCRIPTION OF THE DRAWINGS

Other features and advantages of the device according to the invention and of the manufacturing process thereof will be clear from reading the description hereafter of embodiments given by way of non limitative examples, with reference to the accompanying drawings in which:

FIG. 1 diagrammatically shows a sectional view of a reception unit,

FIG. 2 shows the centering element into which the casing of the reception unit fits, FIG. 3 shows a variant in two parts of the centering element, FIG. 6 illustrates the manufacturing process with the insertion of the moulding piece in the tube in order to confine an injection space around the inserted casing, FIG. 7 shows an embodiment where the centering element is withdrawn after injection and solidification of the substance forming the sheath, and FIG. 8 shows a variant of the previous embodiment where part of the space freed by the withdrawal of the centering element is occulted by moulding pieces 15.

DESCRIPTION OF THE PREFERRED EMBODIMENTS

Figure 4:
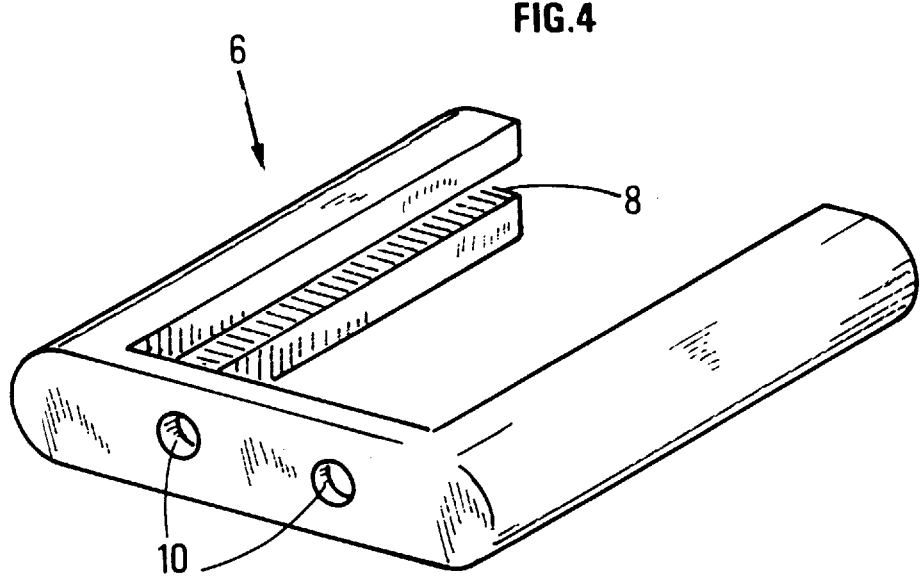
FIG. 4 shows a variant of the embodiment of FIG. 2 with an open end, FIG. 5 diagrammatically shows the device with its tube containing the reception unit.

The device comprises one or more reception units 1 comprising each (FIG. 1) a casing made up of two identical cups 2a, 2b arranged symmetrically, resting against each other on the periphery thereof, provided for example with a support edge or rim 3. The two cups can be machined or obtained by a forming process, notably by embossing. A sensitive element such as a piezoelectric ceramic disk associated for example with two electrodes 5, each one being electrically connected to a conducting wire 5a, 5b, is stuck onto the face of the flexible central part of each of the cups 2a, 2b. The electrode 5b of each sensitive element can be made up of a conducting film interposed between the sensitive disk and the support face of cup 2a, 2b or of a conducting face thereof against which the disk is pressed. Preferably, according to a conventional connection mode, the 20 electrodes 5a, 5b of the two sensitive elements are respectively interconnected.

Each reception unit 1 is associated with (FIGS. 2, 3) a flat and thin centering element 6 made of a plastic material and provided with a central recess 7 whose dimensions are suited to that of casing 2a, 2b. Two opposite edges of this central recess 7 are provided with slots 8 of spacing d between which the rims 3 of the cups can fit. The centering element can be made all in one piece (FIG. 2) or in two pieces 6a, 6b provided with complementary slots 8 into which rim 3 engages (FIG. 3).

Two opposite edges of centering element 6 are rounded. Their spacing D is suited to the inside diameter of a rigid tube 9 (FIG. 5) in which centering element 6 is to be placed after insertion of casing 2a, 2b. The other two edges of the centering element are crossed by openings 10.

According to the embodiment of FIG. 4, one of the two edges is suppressed, centering element 6 being open on this side.

Figure 5:
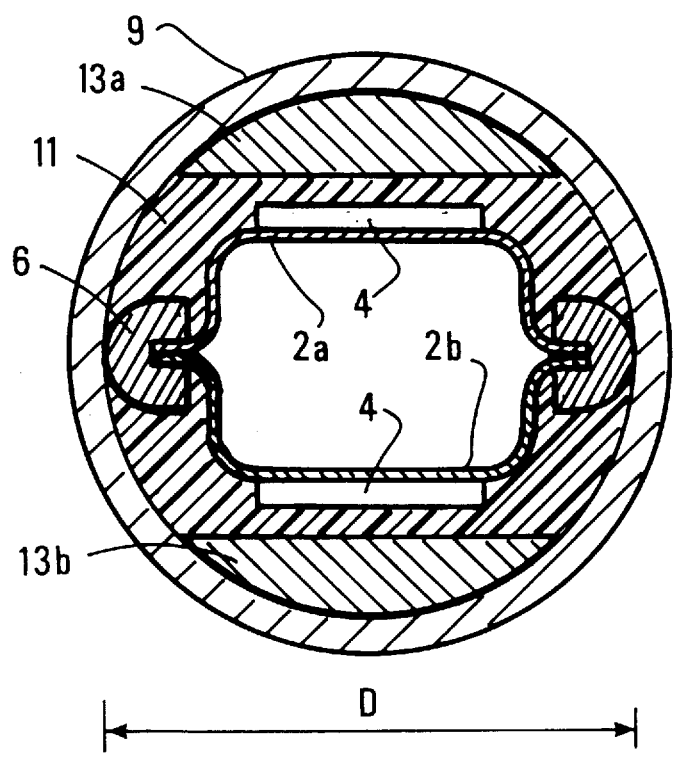

Centering element 6 with its inserted reception unit 1, after being set in tube 9, is embedded (FIG. 5) in a sealing sheath 11 of controlled thickness. To that effect, a U-shaped moulding piece 12 (FIG. 6) is associated with the assembly (1, 6) in its rigid tube 9. The two legs 13a, 13b of this U-shaped piece are suited to fit into tube 9 on either side of assembly 1, 6 while leaving around it a space of well-determined thickness. An acoustically transparent plastic material is injected into this free space around assembly 1, 6 through the openings 10 provided at the ends of the centering part. After hardening by polymerization for example and withdrawal of the moulding piece 12, 13, the coating tightly covers reception unit 1 in its centering element 6 by taking the exact shape of the inner wall of rigid tube 9 (FIG. 5).

According to the embodiment of FIG. 7, the two parts 6a, 6b of the centering element are withdrawn (see embodiment of FIG. 3) after solidification of the protective sheath. Any direct contact between the casing (2a, 2b) and the rigid outer tube 9, which is a possible source of direct vibration transmission, is then suppressed. This freed space 14 can remain empty of material but it can also be filled by injection of a plastic material that is preferably vibration damping, either totally or only partly (FIG. 8) by interposing, prior to injection, moulding pieces 14 in order to improve the damping of the parasitic vibrations applied to cups 2a, 2b and likely to disturb the signals.

An embodiment where the rigid tube 9 used is a cylindrical solid of revolution has been described. Such a rigid tube is particularly suitable for applications where the reception units have to be set at regular intervals in a seismic streamer that can be towed by a boat for subsea listening or seismic prospecting applications. However, any other container whose shape might be more appropriate for the use considered can be used without departing from the scope of the invention.

An embodiment where the cups 2a, 2b of each casing are provided with rims 3 and centering element 6 is provided with slots 8 for supporting these rims has also been described. Without departing from the scope of the invention, it is also possible to use cups without a rim, resting against each other on the periphery thereof, and a centering element 6 suited to support sufficiently one or more casings during later operations of setting in tube 9.

We claim:

1. A process for manufacturing a hydrophone comprising at least one reception unit (1) intended to be placed inside a rigid tube (9), each reception unit comprising a casing made up of two cups (2a, 2b) having each a support face resting against a corresponding support face of the other cup, each one of them being provided with a flexible central part, and at least one sensitive element (4) associated with electrodes (5), that is fastened to the central part of at least one of the cups, and electric conductors (5a) connected to the electrodes of each sensitive element (4), comprising successively:

fitting at least one casing into a flat rectangular centering element suited to rest by two of its opposite sides against the inner wall of the tube, inserting into the rigid tube the centering element containing said casing, inserting moulding pieces (12) into rigid tube (9) in order to fill the main part of the remaining inner volume of rigid tube (9) on either side of centering element (6), except for a space of well-determined thickness on either side of the centering element, and injecting into rigid tube (9), in said space around centering element (6), a material forming a sealed protective sheath (11).

2. A process as claimed in claim 1, comprising withdrawal of centering element (6) after formation of the protective sheath (11) so as to suppress any direct coupling of reception unit (1) with rigid tube (9).

3. A process as claimed in claim 2, comprising injecting into at least part of the space freed by the withdrawal of centering element (6), delimited by insertion of moulding pieces (14), a sealing material for insulating each reception unit (1).

4. A process as claimed in claim 3, wherein the sealing material selected is a vibration damping material so as to decouple acoustically each reception unit (1) with respect to rigid tube (9).

5. A process as claimed in claim 1, comprising using a centering element made of a vibration damping material, said casing in the centering element thereof being embedded in the injected material forming a sealing sheath.

6. A hydrophone comprising at least one detection unit (1) including a casing made up of two cups (2a, 2b) having each a support face resting against a corresponding support face of the other cup, each one of them being provided with a flexible central part, and at least one sensitive element (4) associated with electrodes (5), that is fastened onto the central part of at least one of the cups, on a face thereof that becomes concave when it is subjected to an increase in the outside static pressure, electric conductors (5a) connected to the electrodes (5) of each sensitive element (4), comprising a rigid external tube (9), a means allowing sealed positioning of at least one casing in a diametral plane of the tube, obtained by injection of a sealing material forming a coating of controlled thickness for detection unit (1) and part of the inner wall of rigid tube (9).

7. A hydrophone as claimed in claim 6, wherein the sealed positioning means comprises two recesses (15) in a diametral zone of rigid tube (9) containing the support faces of cups (2a, 2b).

8. A hydrophone as claimed in claim 7, wherein part of the two recesses (15) is filled with a vibration damping material.

9. A hydrophone as claimed in claim 6, wherein the sealed positioning means comprises a hollowed flat centering element (6) suited to rest by two of its opposite sides against the inner wall of the rigid tube in an axial plane thereof, said element being provided with a recess for at least one casing, and a sealed protective coating (11) of controlled thickness around this centering element (6).

10. A hydrophone as claimed in claim 9, wherein centering element (6) is provided with an inner slot (8) for fitting in a peripheral edge (3) of the two cups (2a, 2b) of the casing.

11. A hydrophone as claimed in claim 9, wherein centering element (6) is made all in one piece.

12. A hydrophone as claimed in claim 9, wherein centering element (6) is made of two parts (6a, 6b) between which the casing is supported.

13. A hydrophone as claimed in claim 9, wherein centering element (6) is made of one U-shaped piece with two legs between which the casing is supported.

14. A hydrophone as claimed in claim 9, wherein each reception unit comprises two sensitive elements associated respectively with the two cups (2a, 2b) of each casing.

15. A hydrophone as claimed in claim 9, wherein cups (2a, 2b) are obtained by means of a forming process, notably by embossing.

\* \* \* \* \*